(12) United States Patent
Quamar et al.

(10) Patent No.: US 11,321,534 B2
(45) Date of Patent: May 3, 2022

(54) CONVERSATION SPACE ARTIFACT GENERATION USING NATURAL LANGUAGE PROCESSING, MACHINE LEARNING, AND ONTOLOGY-BASED TECHNIQUES

(71) Applicant: International Business Machines Corporation, Armonk, NY (US)

(72) Inventors: Abdul Quamar, San Jose, CA (US); Fatma Ozcan, San Jose, CA (US); Dorian Boris Miller, Saratoga, CA (US); Jeffrey Thomas Kreulen, San Jose, CA (US); Christina Runkel, Guellesheim (DE)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/815,476

(22) Filed: Mar. 11, 2020

(65) Prior Publication Data
US 2021/0286950 A1    Sep. 16, 2021

(51) Int. Cl.
*G06F 17/00* (2019.01)
*G06F 40/30* (2020.01)
*G06N 5/04* (2006.01)
(Continued)

(52) U.S. Cl.
CPC .......... *G06F 40/30* (2020.01); *G06F 16/2379* (2019.01); *G06F 16/2393* (2019.01);
(Continued)

(58) Field of Classification Search
None
See application file for complete search history.

(56) References Cited

U.S. PATENT DOCUMENTS

| 8,577,671 | B1 * | 11/2013 | Barve | G06F 16/24573 |
| | | | | 715/752 |
| 9,740,685 | B2 | 8/2017 | Beaurpere et al. | |
| 10,049,162 | B2 | 8/2018 | Estes | |
| 10,503,767 | B2 * | 12/2019 | Van Hoof | G06N 7/005 |
| 10,540,513 | B2 * | 1/2020 | Van Hoof | G06F 21/6227 |

(Continued)

OTHER PUBLICATIONS

"A quick and generic system to evaluate/assess free text responses in e-Learning", An IP.com Prior Art Database Technical Disclosure, Authors et al: Disclosed Anonymously, IP.com No. IPCOM000210071D, Electronic Publication Date Aug. 25, 2011, 10 Pages.

(Continued)

*Primary Examiner* — Satwant K Singh
(74) *Attorney, Agent, or Firm* — Stephen R. Tkacs; Aaron Pontikos; Stephen J. Walder, Jr.

(57) ABSTRACT

A method is provided to implement a conversational system with artifact generation. A middleware component receives a user input and determines whether there is sufficient information in the user input and a conversation space in a context storage of the conversational system to identify user intent associated with the user input. Responsive to the middleware component determining there is not sufficient information to identify user intent, a communications handler component sends a natural language query to an external data source via a natural language query (NLQ) interface and receives a natural language response from the external data source. The middleware component updates the conversation space based on the natural language response and returns a user response based on the natural language response.

20 Claims, 15 Drawing Sheets

(51) Int. Cl.
    *G06F 40/295* (2020.01)
    *G06F 16/23* (2019.01)
    *G06F 16/242* (2019.01)
(52) U.S. Cl.
    CPC .......... *G06F 16/243* (2019.01); *G06F 40/295* (2020.01); *G06N 5/04* (2013.01)

(56) References Cited

U.S. PATENT DOCUMENTS

| | | | |
|---|---|---|---|
| 2015/0261745 | A1 | 9/2015 | Song et al. |
| 2017/0329466 | A1* | 11/2017 | Krenkler ................. G06F 40/30 |
| 2019/0236205 | A1* | 8/2019 | Jia ....................... G06F 16/3329 |
| 2019/0362094 | A1* | 11/2019 | Van Hoof ........... G06F 21/6227 |

OTHER PUBLICATIONS

"Method and System for Automatically Generating Large-Scale Question and Answering (QA) Dataset by Reusing Existing Natural Language Annotations", An IP.com Prior Art Database Technical Disclosure, Authors et al: Disclosed Anonymously. Electronic Publication Date Jan. 3, 2019, IP.com No. PPCOM000256831D, 5 Pages.

Bures, T et al., "Requirement Specifications Using Natural Languages", Charles University, Faculty of Mathematics and Physics Dep. of Distributed and Dependable Systems, Technical Report D3S-TR-2012-05, Dec. 2012, 81 pages.

Hofford, Glenn, "Structured Logic: A New Method that Enables Richer Meaning Representations", An IP.com Prior Art Database Technical Disclosure, IP.com No. IPCOM000235703D, Electronic Publication Date: Mar. 21, 2014, 447 Pages.

Pustejovsky, James et al., "Natural Language Annotation for Machine Learning: A Guide to Corpus-Building for Applications", O'Reilly Media, Inc., Oct. 11, 2012, 96 pages.

Young, Tom et al., "Recent Trends in Deep Learning Based Natural Language Processing", arXiv:1708.02709v8 [cs.CL] Nov. 25, 2018, 32 pages.

* cited by examiner

*FIG. 7B*

750 → Public Metric PublicCompany_name     ⚙ Customize ✕

760 {
If bot recognizes:

PublicMetric ⊖ [AND] @PublicCompany_name ⊖ [AND]

@PublicMetric_metric_na ⊖ ⊕
}

Then respond with:

770 →
```
1  {
2    "context": {
3      "action": "true",
4      "intent": "PublicMetric",
5      "entities": {
6        "PublicCompany_name": "@PublicComkpany_name",
7        "PublicMetric_metric_name": "@PublicMetric_metric_name"
8      }
9      "info_req": "false",
10     "deleteEntities": "false"
11   }
12   "output": {}
13 }
```

⊕ Add another response

CONVERSATION SPACE ARTIFACT GENERATION USING NATURAL LANGUAGE PROCESSING, MACHINE LEARNING, AND ONTOLOGY-BASED TECHNIQUES

BACKGROUND

The present application relates generally to an improved data processing apparatus and method and more specifically to mechanisms for conversation space artifact generation using natural language processing, machine learning, and ontology-based techniques in a conversation service.

The IBM Watson® Conversation Service allows an administrator to create an application and user agents that understand natural language input and communicate with users simulating a real human conversation. Conversation services respond to customers in a way that simulates a conversation between humans. Users interact with the application through one or more interfaces. Common choices might be messaging services, a chat window within a Web site, or even audio interfaces when combined with a speech-to-text service. The application sends the user input to the conversation service.

The application connects to a workspace. The natural language processing for the conversation service happens inside a workspace, which is a container for all the artifacts that define the conversation flow for an application. Each workspace is trained to recognize certain concepts and to direct the conversation flow that governs user interaction. The conversation service interprets user input, directs the flow of the conversation, and gathers information that it needs. Based on identified concepts, the conversation service directs the conversation flow to provide the user with information or to gather additional information from the user.

The application can also interact with existing back-end systems based on the user's intent and additional information. For example, the application may search for information in public or private databases, open tickets, show diagrams and maps, or write the user input into systems of record.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement a conversational system with artifact generation. The method comprises receiving, by a middleware component of the conversational system, a user input and determining, by the middleware component, whether there is sufficient information in the user input and a conversation space in a context storage of the conversational system to identify user intent associated with the user input. The conversation space includes intents, entities, dialog, and context for a given interaction with the user. The method further comprises sending, by a communications handler component within the conversational system, a natural language query to an external data source via a natural language query (NLQ) interface responsive to the middleware component determining there is not sufficient information to identify user intent. The method further comprises receiving, by the communications handler component, a natural language response from the external data source. The method further comprises updating, by the middleware component, the conversation space based on the natural language response and returning, by the middleware component, a user response based on the natural language response.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 7A and 7B depict an example user interface for defining dialog nodes in accordance with an illustrative embodiment;

DETAILED DESCRIPTION

Figure 1:
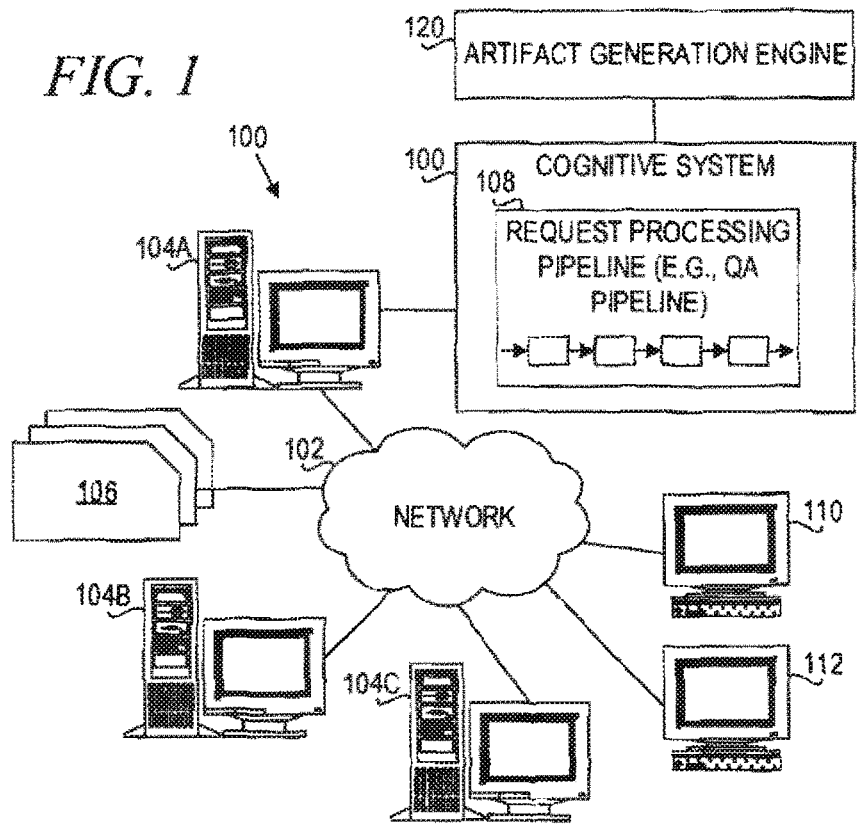
FIG. 1 depicts a schematic diagram of one illustrative embodiment of a cognitive healthcare system in a computer network.

Conversational systems are rapidly gaining popularity as a mechanism to provide a more natural and intuitive way to interact with real world systems. Businesses and applications in a variety of different domains are using conversational systems as part of their user interfaces to provide a better quality of service and a richer experience to explore available information, make informed decisions and materialize business transactions. Conversational systems can be broadly classified into two categories. One category includes systems that are pre-built and available as part other products, such as operating systems, mobile phones and other electronic devices. These are more or less general-purpose conversational systems and are not targeted for a particular domain. The other category includes custom or domain specific conversational systems that are targeted for particular applications, such as finance, travel, healthcare, etc. Usually there is an end goal for such applications. For example, a travel agent chatbot would endeavor to book a travel itinerary for the customer through conversational interactions. This type of conversational system can be custom built using existing services such as the IBM Watson® Conversation Service.

Aspects of the illustrative embodiments described herein may be applied to this second category of conversational systems, particularly highlighting the limitations of the services available for building such conversational systems (or agents). The illustrative embodiments propose a new architecture to build data driven conversational systems to overcome these limitations. Building a conversational system (or agent or chatbot) using existing conversational services requires intents, entities, and dialog.

Intents represent the purpose or goal expressed in the user input/query. Conversational services typically use a Deep Learning network to identify intents from a given user query within the context of a conversation. As a consequence, most systems require upfront specification of all intents with labeled query examples for training a neural network. These intents are usually based on the purpose of the business application and the scope of questions that it intends to handle and the anticipated set of questions that users might ask within the scope of the business application.

Entities represent real-world objects relevant to the context of a user query. The conversational system chooses specific actions based on identification of entities within a specific intent. These need to be provided as a set of predefined entities with examples and domain-specific synonyms (the domain vocabulary) relevant within the context of the conversational application.

A dialog is the structural representation of the flow of conversation for a conversational agent. There are different ways of representing such a structure, e.g., a tree, a state machine, etc. The dialog uses discovered intents, entities, and context from the application to provide an interactive conversational experience to the user. For available conversational services, the dialog must be statically defined at the time of instantiation of the service. This requires the manual specification of all possible conversational flows that the conversational agent is required to handle up front. This leaves little room for flexibility or dynamic interaction through learning from user interactions and data-driven context.

External data sources may include databases, knowledge graphs, or recommendation services, etc. For existing conversational systems, interaction with external data sources must be orchestrated through an external application. There is no inherent support for using context gathered from external data sources to drive the conversation. For example, there is no support in current systems for a healthcare chat bot to follow a different conversational flow for two users initiating the same query depending on their age and prior medical history.

The illustrative embodiments provide mechanisms to create a system and tooling to repeatedly generate the conversational system. The system of the illustrative embodiments is domain agnostic such that the same tooling can be applied to different domains. The tooling enables subject matter experts (SMEs) to enter domain-specific information. Finally, the tooling automatically generates the artifacts that are used in the conversational system. This can be done dynamically to continuously improve the conversational system.

The conversational system identifies the information about entities and the user's question. The illustrative embodiments focus on generating the conversation artifacts. A complete product would next construct a query to the content storage. The query results are formatted and displayed to the user. The illustrative embodiments are directed to natural language processing and machine learning based ontology artifact generation as described herein.

The system is able to traverse an ontology and generate questions based on the entities and their relationships, utilize SME knowledge in developing artifacts, or automatically develop artifacts, for use in a conversational system. Often when developing a conversational system, there are questions not considered by the developers, and the present system is able to dynamically identify such questions and add them to the conversational system so that the next time a user asks a similar question the system can answer the question appropriately.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
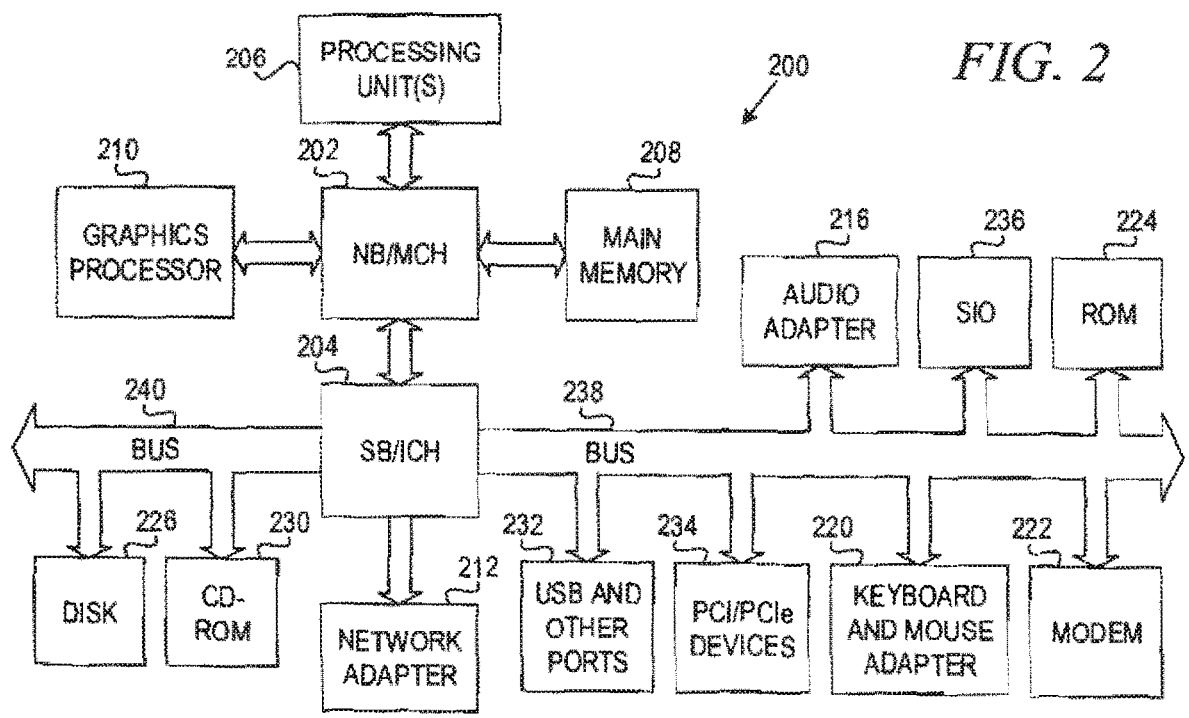
FIG. 2 is a block diagram of an example data processing system in which aspects of the illustrative embodiments are implemented.

As noted above, the present invention provides mechanisms for natural language processing, machine learning, ontology-based artifact generation for the conversation system. The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is directed to describing an example cognitive system for conversational applications which implements a request processing pipeline, request processing methodology, and request processing computer program product with which the mechanisms of the illustrative embodiments are implemented. These requests may be provided as structured or unstructured request messages, or any other suitable format for requesting an operation to be performed by the conversational system.

It should be appreciated that the conversational system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, the request processing pipelines may be configured to provide different types of cognitive functions or support different types of business applications.

As will be discussed in greater detail hereafter, the illustrative embodiments may be integrated in, augment, and extend the functionality of these mechanisms of a conversational system with regard to natural language processing and machine learning based ontology artifact generation. Thus, it is important to first have an understanding of how cognitive systems are implemented before describing how the mechanisms of the illustrative embodiments are integrated in and augment such cognitive systems and request processing pipeline mechanisms. It should be appreciated that the mechanisms described in FIG. 1 are only examples and are not intended to state or imply any limitation with regard to the type of cognitive system mechanisms with which the illustrative embodiments are implemented. Many modifications to the example cognitive system shown in FIG. 1 may be implemented in various embodiments of the present invention without departing from the spirit and scope of the present invention.

FIG. 1 depicts a schematic diagram of one illustrative embodiment of a cognitive system 100 implementing a request processing pipeline 108 in a computer network 102. The cognitive system 100 is implemented on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like, and the answer may be returned in a natural language format maximized for efficient comprehension in a point-of-care clinical setting. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

The cognitive system 100 implements the pipeline 108, which comprises a plurality of stages for processing an input request based on information obtained from the corpus or corpora of data 106. The pipeline 108 generates responses for the input request based on the processing of the input request and the corpus or corpora of data 106.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for artifact generation engine 120 for natural language processing and machine learning based ontology artifact generation. The illustrative embodiments propose a data-driven conversational system architecture that supports entity specification using domain vocabulary, intent specification using a hybrid approach, and dynamic responses using data-driven context.

In accordance with one aspect of the illustrative embodiments, artifact generation engine 120 extracts domain-specific entities from the domain vocabulary. Artifact generation engine 120 uses the bulk loading application programming interface (API) of the conversational service to load or specify these domain specific entities.

The illustrative embodiments propose boot strapping the system with an initial set of domain-specific intents with examples. Artifact generation engine 120 uses a natural language querying (NLQ) interface to an external knowledge base for dynamic intent and entity learning and discovery. Artifact generation engine 120 calls the NLQ feedback loop. Artifact generation engine 120 performs dynamic dialog creation to support discovered intents and entities.

The illustrative embodiments also propose interfacing the conversational application with a domain-specific knowledge base. The illustrative embodiments build a mechanism to exchange data-driven context between conversational service and the external application. The illustrative embodiments provide dynamic answers based on context gathered from real-world data from external sources.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P™ computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
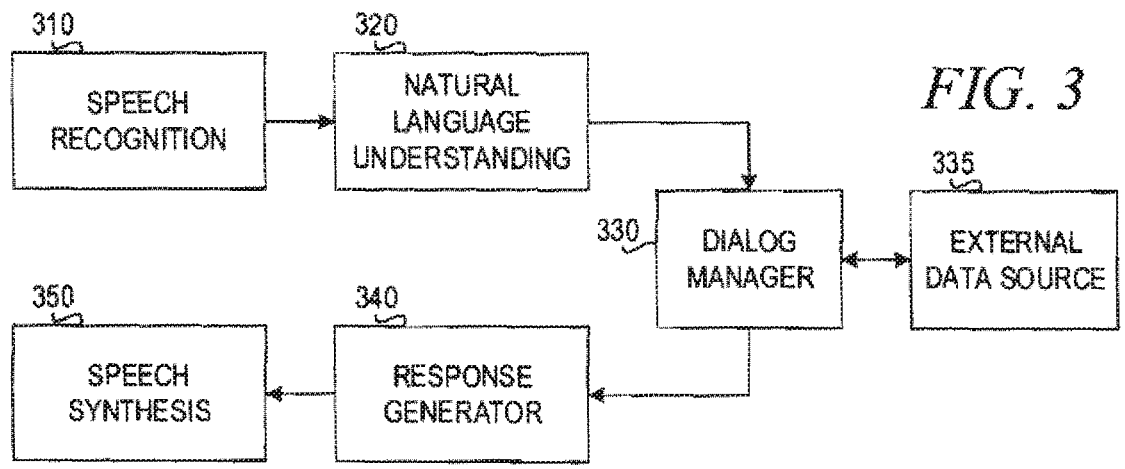
FIG. 3 is a block diagram of a conversational system in accordance with an illustrative embodiment.

FIG. 3 is a block diagram of a conversational system in accordance with an illustrative embodiment. The conversational system as depicted in FIG. 3 represents the conversational path between a user and a computer. The conversational system communicates with humans in spoken or written form. In the depicted example, the conversational system receives user input via speech recognition in block 310 and performs natural language understanding at block 320. Dialog manage 330 gets user input and application context, extracts entities and intents from the user input, and evaluates conditions using context, entities, and intents. Dialog manager 330 also interacts with external data source 335 to provide information to the user. Response generator 340 then provides output to the user via speech synthesis at block 350. The dialog system may be a pre-build general-purpose dialog system, a task-driven conversation system, or a conversational system for data exploration.

Figure 4:
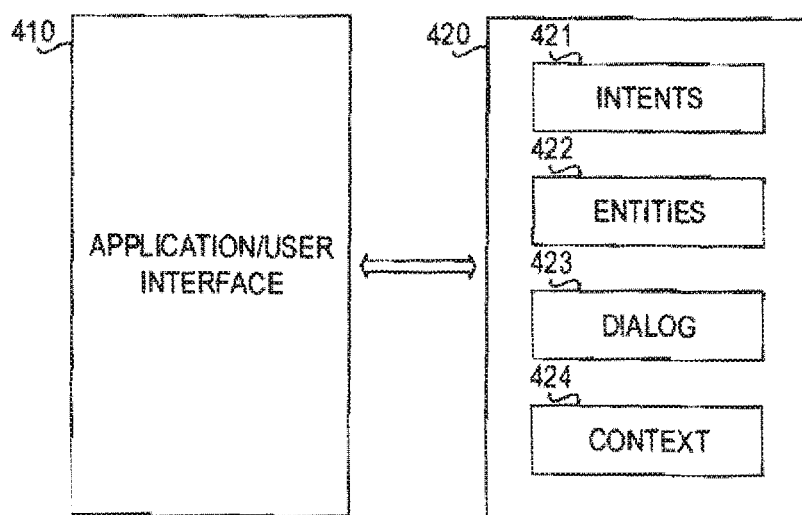
FIG. 4 is a block diagram illustrating a conversation space in accordance with an illustrative embodiment.

FIG. 4 is a block diagram illustrating a conversation space in accordance with an illustrative embodiment. Application/user interface 410 interacts with workspace 420 via an application programming interface (API). Workspace 420 includes intents 421, entities 422, dialog 423, and context 424 for a given interaction with a user. Intents 421 represent the purpose or goal expressed in the user input/query. In an illustrative embodiment, the conversation engine uses Deep Learning classifiers to identify intents 421. Entities 422 represent real-world objects relevant in the context of a user query. The conversation system can choose specific actions based on identification of entities 422.

Dialog 423 uses discovered intents 421, entities 422, and context 424 from the application to provide an interactive conversational experience to the user. Dialog 423 uses context across conversational turns or user utterances. It is unlikely the user will provide all of the required information in one pass. Instead, the conversational system must organize a conversation flow that will ask the user questions that are useful in order to gather all the necessary input to provide a helpful answer. Dialog 423 is a branching conversation flow that defines how the application responds when it recognizes the defined intents 421 and entities 422. Dialog 423 is composed of many branching dialog nodes.

Context 424 is a mechanism for passing information between the dialog 423 and the application. Context 424 allows the conversational system to store information to continue passing back and forth across different dialog nodes. For example, if the system identifies names of users in the conversation flow, the conversational system stores that information in context 424 and retrieve it any time the system calls the user by name.

Figure 5:
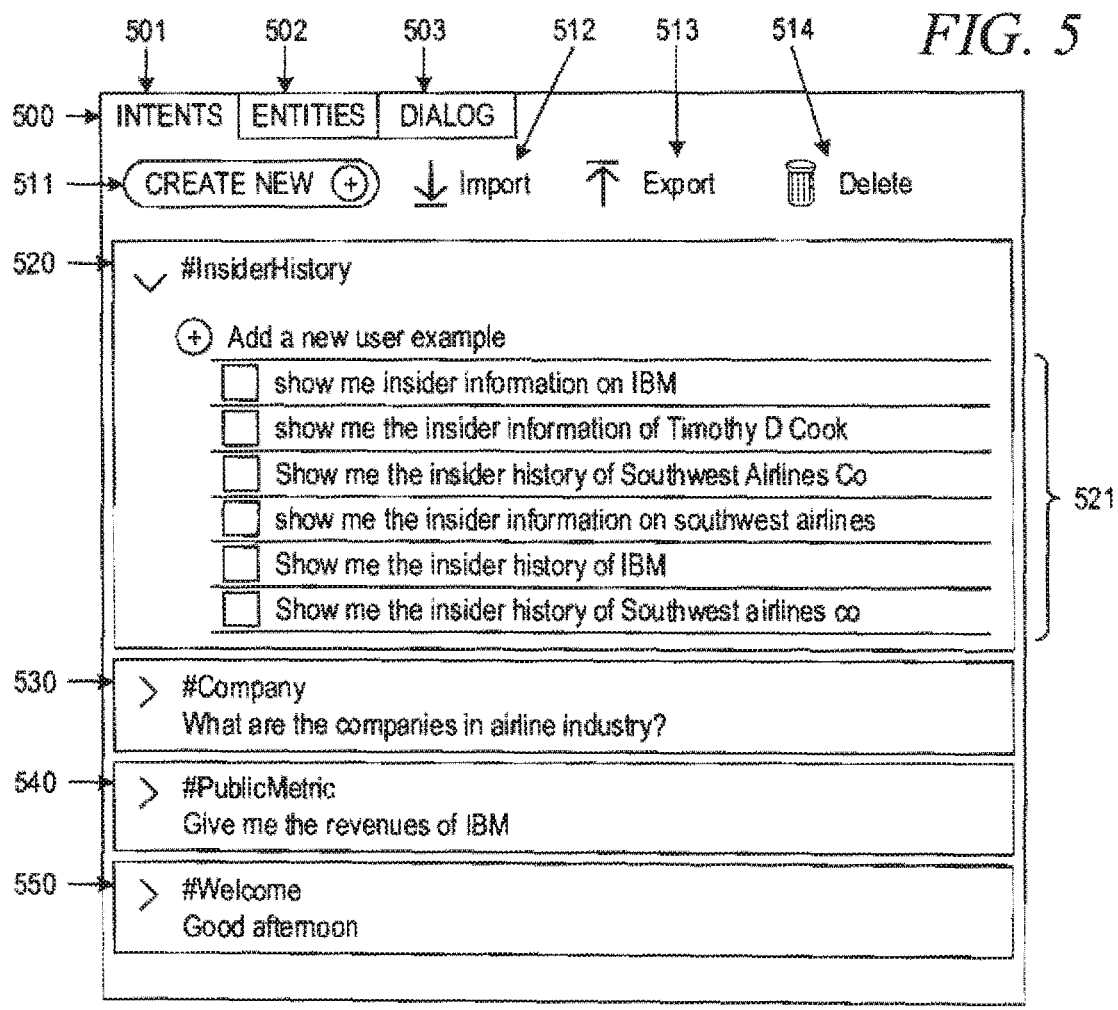
FIG. 5 depicts an example user interface for defining intents in accordance with an illustrative embodiment.

FIG. 5 depicts an example user interface for defining intents in accordance with an illustrative embodiment. User interface display 500 includes intents tab 501, entities tab 502, and dialog tab 503. In the depicted example, intents tab 501 is selected. User interface 500 also includes create new control 511, import control 512, export control 513, and delete control 514. The user may select create new control 511 to create a new intent. The user may select import control 512 to import an intent. The user may select export control 513 to export an extent. The user may select delete control to delete an intent. These controls are similar for entities in the user interface described below.

In the depicted example, the user interface 500 presents intent display portions 520, 530, 540, and 550. As shown in FIG. 5, intent display portion 520 corresponds to the intent "#InsiderHistory." In the intent display portion 520, the user may select from a plurality of user examples 521. Other intents shown in FIG. 5 include "#Company" to identify the names of companies, "#PublicMetric" to identify values of public metrics, such as revenue, and "#Welcome" to display a welcome greeting. These intents represent the purpose of the user's input.

Figure 6:
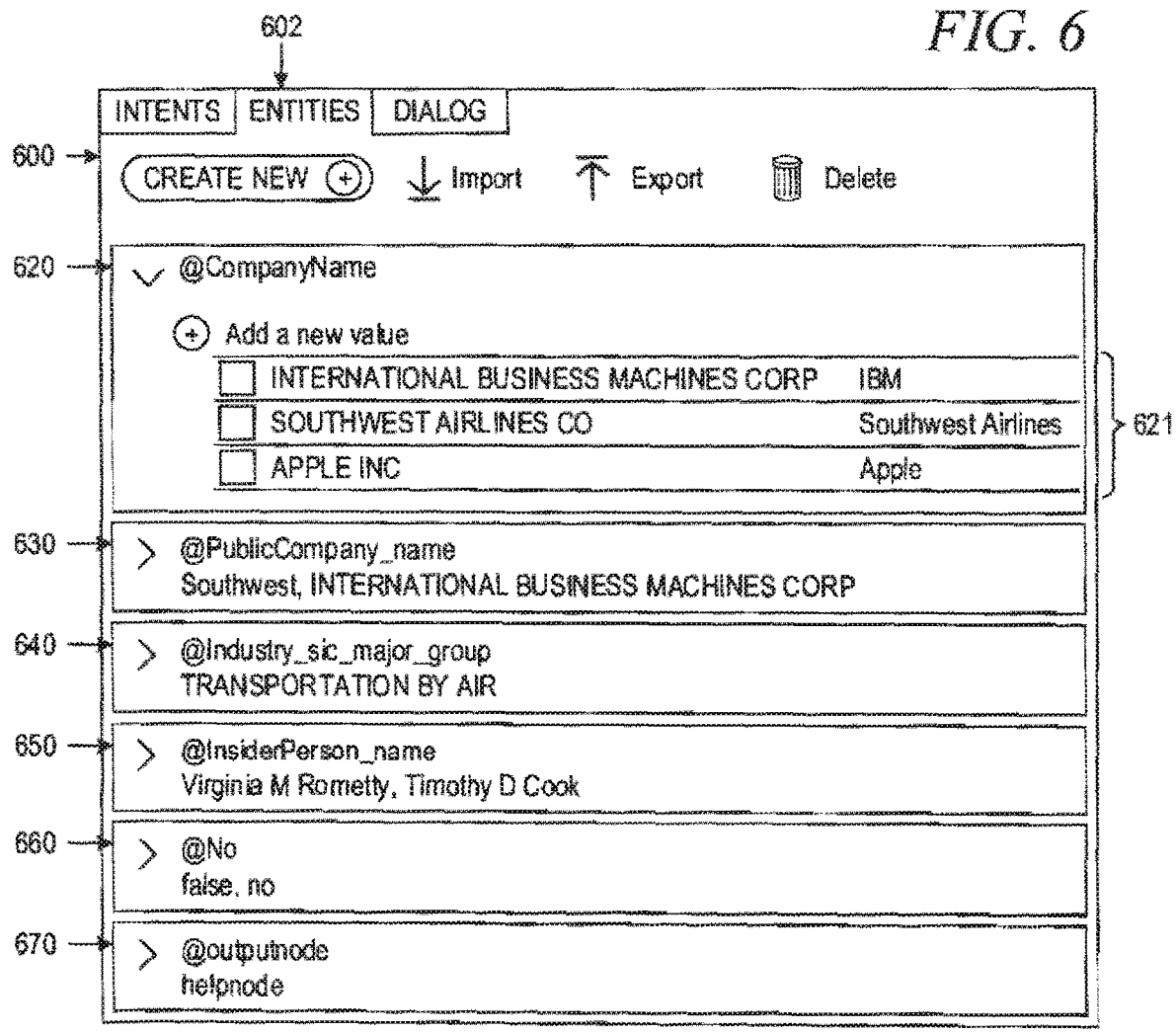
FIG. 6 depicts an example user interface for defining entities in accordance with an illustrative embodiment.

FIG. 6 depicts an example user interface for defining entities in accordance with an illustrative embodiment. In user interface 600, entities tab 602 is selected. User interface 600 presents entity display portions 620, 630, 640, 650, 660, and 670. As shown in FIG. 6, entity portion 620 corresponds to the entity "@CompanyName." In the entity display portion 620, the user may select from values 621. Other entities shown in FIG. 6 include "@PublicCompany_name," "@Industry_sic_major_group," "@InsiderPerson_name," "@No," and "@outputnode." These entities may take various values provided by the user or discovered in external sources.

Figure 7A:
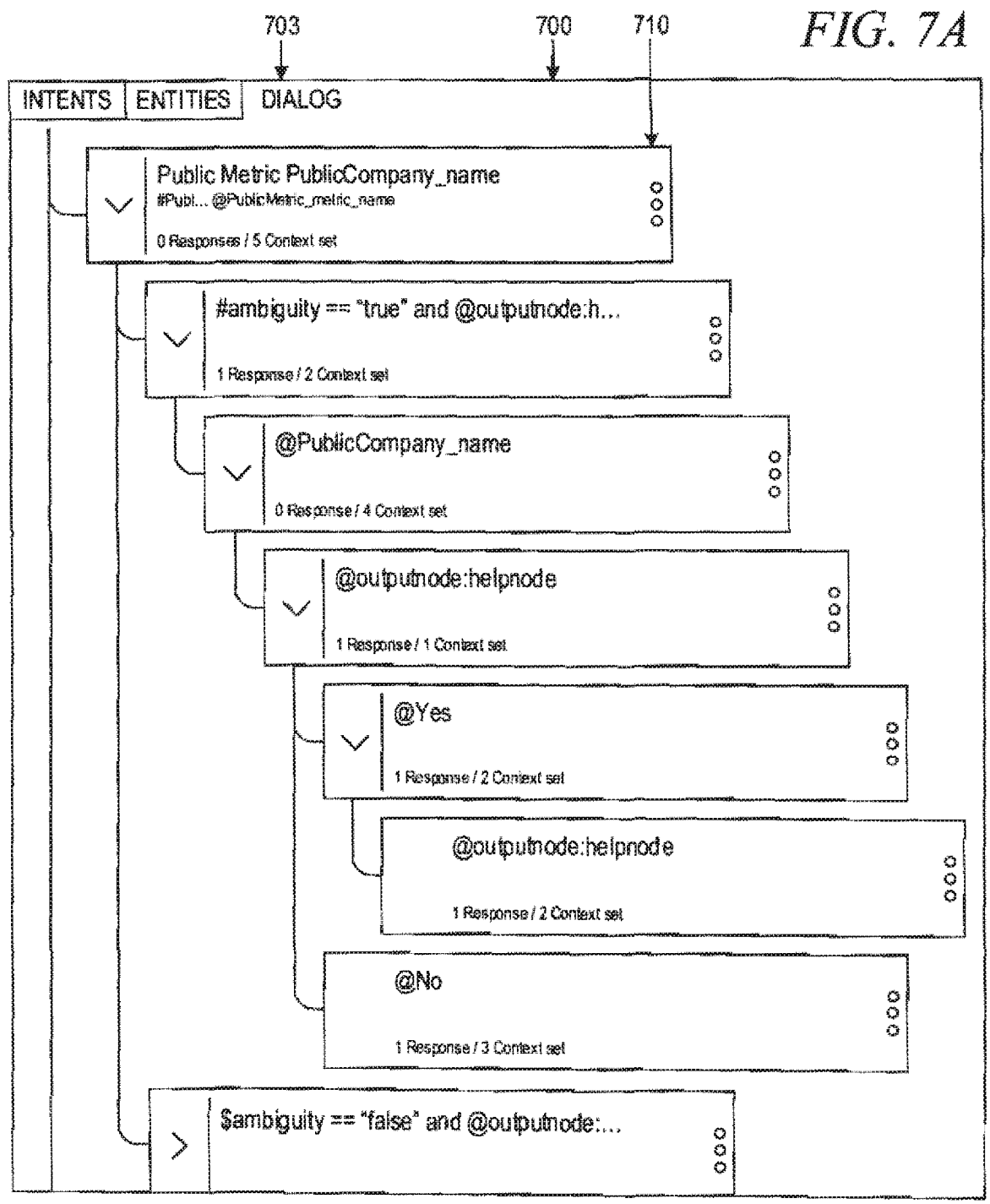

FIGS. 7A and 7B depict an example user interface for defining dialog nodes in accordance with an illustrative embodiment. With reference to FIG. 7A, in user interface 700, dialog tab 703 is selected. User interface 700 presents dialog nodes, such as dialog node 710, for defining a conversation flow. A dialog is made up of nodes that define the steps in the conversation. Dialog nodes are chained together in a tree structure to create an interactive conversation with the user. Each node starts with one or more lines that the conversational system shows to the user to request a response. Each node includes conditions for the node to be active and also an output object that defines the response provided. A node is similar to an if-then construction: if this condition is true, then return this response.

In the depicted example shown in FIG. 7A, dialog node 710, "Public Metric PublicCompany_name," is selected. With reference to FIG. 7B, user interface 750 presents the definition interface for the selected dialog node. User interface 750 includes condition portion 760 and response portion 770. The user may then set the parameters for the condition in portion 760. The user may then define the response in portion 770.

In prior art conversational systems, there is no automated way for conversational agents to learn the domain knowledge in terms of expected workload and vocabulary. The developer must provide all predefined intents and user query examples for training based on what users might want to do and what the chat application should handle. The developer must manually specify all predefined entities and examples with synonyms. In prior art systems, the dialog must be statically defined and currently does not use data-drive content.

As mentioned above, the illustrative embodiments propose a data-driven conversational system. The illustrative embodiments solve the deficiencies of the prior art by providing an architecture that supports entity specification using domain vocabulary, intent specification using a hybrid approach, and dynamic responses using data-driven context.

Figure 8A:
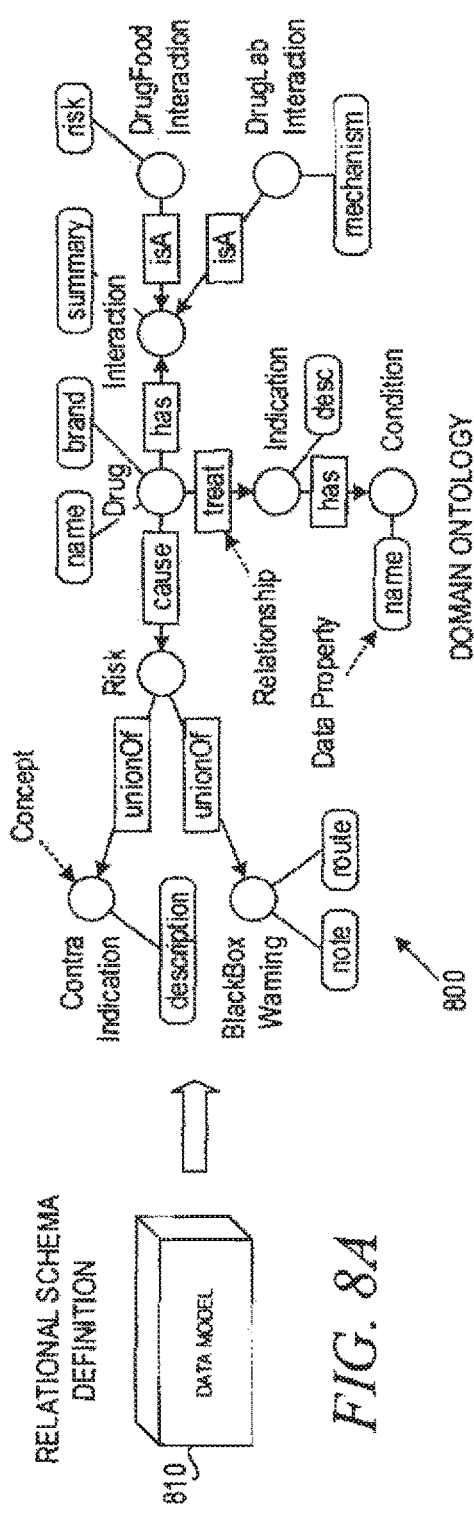
FIGS. 8A and 8B illustrate ontology-driven conversational artifact generation in accordance with an illustrative embodiment.
Figure 8B:
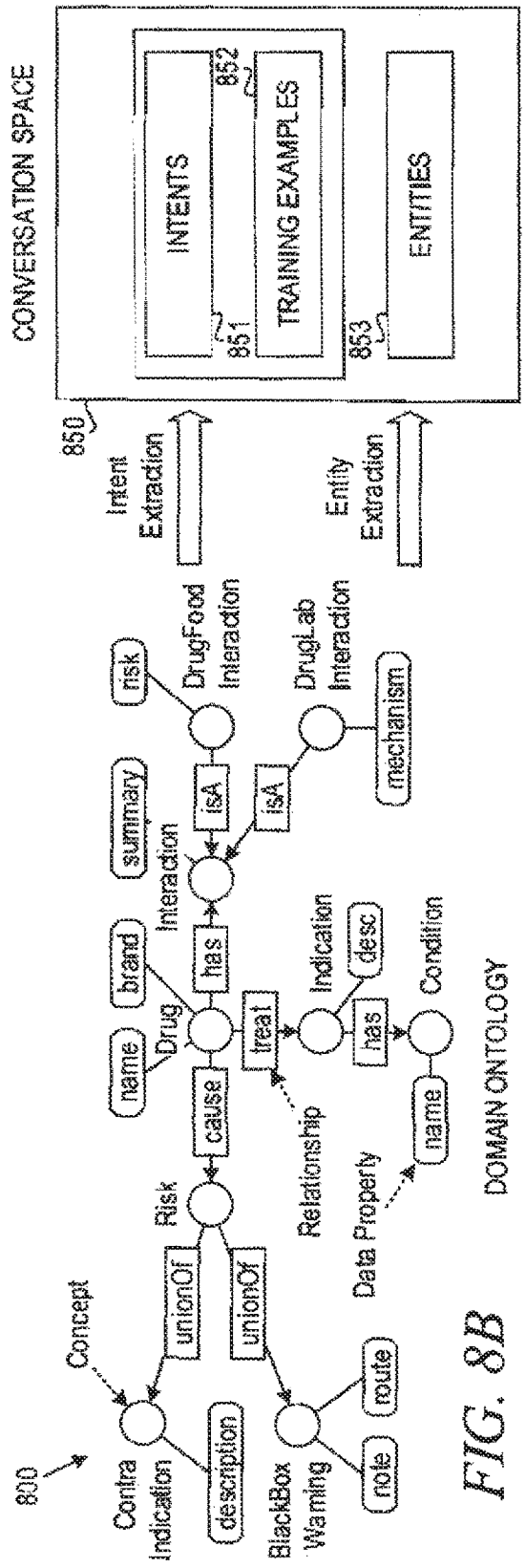

FIGS. 8A and 8B illustrate ontology-driven conversational artifact generation in accordance with an illustrative embodiment. With reference to FIG. 8A, data model 810 provides a representation of the domain schema in the form of a domain ontology 800. Turning to FIG. 8B, intents and entities are extracted from domain ontology 800 into conversation space 850. Intent extraction stores intents 851 in conversation space 850.

In accordance with the illustrative embodiment, the artifact generation engine identifies common workload access patterns as intents 851. The artifact generation engine uses domain ontology structure 800 and data statistics to identify key concepts that represent common domain entities that a user would be interested in, e.g., drug, finding. In one embodiment, the artifact generation engine uses centrality analysis and statistical segregation.

The artifact generation engine also identifies dependent concepts that are concepts in the immediate neighborhood of the key concepts, e.g., precaution or dosage associated with a drug. The artifact generation engine identifies workload patterns around pairs of key and dependent concepts to form key and dependent concept patterns, e.g., "Show me the precautions for <@Drug>". The artifact generation engine further identifies patterns containing pairs of key concepts and relationships between them, e.g., "Get<@Drug> from <@Finding> for <@Indication>, <@Condition>". The artifact generation engine may also use forward and inverse relationships, e.g., "What findings does <@Drug> treat?" and "What drug treats<@Finding>?"

In one embodiment, the artifact generation engine uses subject matter experts (SMEs) to identify common patterns in terms of entities and relationships. The artifact generation engine uses regular expressions to capture these patterns as intents 851 and generates query templates for these identified patterns.

In one embodiment, the artifact generation engine uses machine learning (ML) and natural language processing (NLP) techniques for intent generation. The artifact generation engine captures patterns from prior workloads/domain corpus of documents using NLP techniques, such as named entity recognition, and ML techniques to capture access patterns across such entities. The artifact generation engine then generates query templates for these identified patterns.

The artifact generation engine also generates training examples 852. In one embodiment, the artifact generation engine uses pattern matching algorithms that traverse the ontology graph 800 to identify the common access patterns as subgraphs over the ontology. The artifact generation engine extracts relevant entities and relationships to populate the generated templates to generate the training examples 852.

Figure 9A:
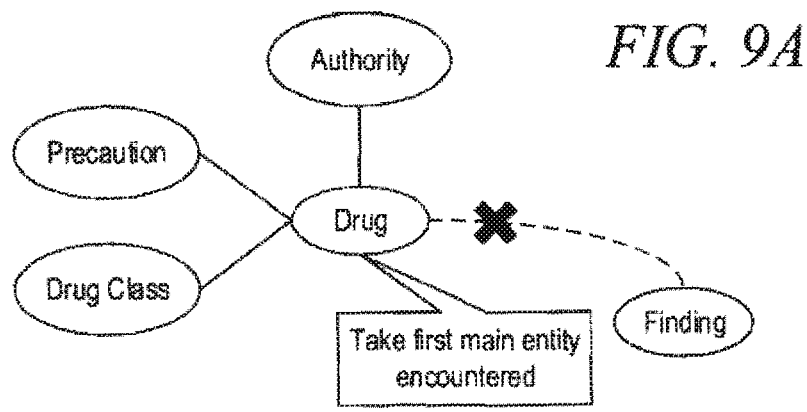
FIGS. 9A and 9B illustrate intent generation using workload access patterns in accordance with an illustrative embodiment.
Figure 9B:
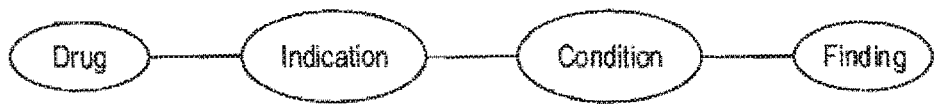

FIGS. 9A and 9B illustrate intent generation using workload access patterns in accordance with an illustrative embodiment. In the example depicted in FIG. 9A, the concept "Drug" is a key concept because it is independent, while concepts such as "Precaution" and "Drug Class" are dependent concepts that depend on the key concept "Drug." As seen in FIG. 9A, there is an unknown relationship between "Drug" and "Finding."

Figure 10A:
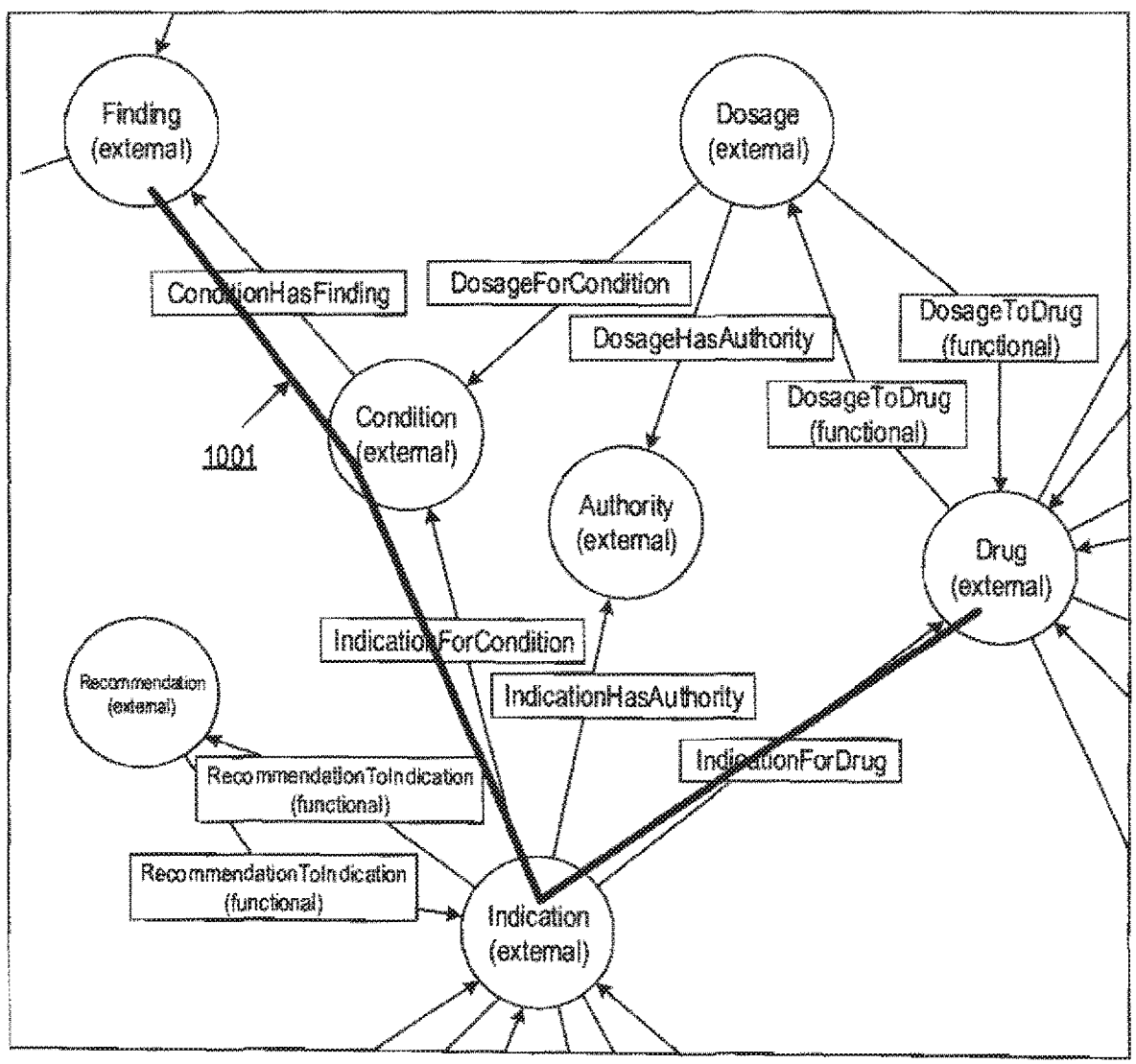
FIGS. 10A and 10B demonstrate the traversal of the ontology to identify a pairing of entities and the identifications of intent in accordance with an illustrative embodiment.
Figure 10B:
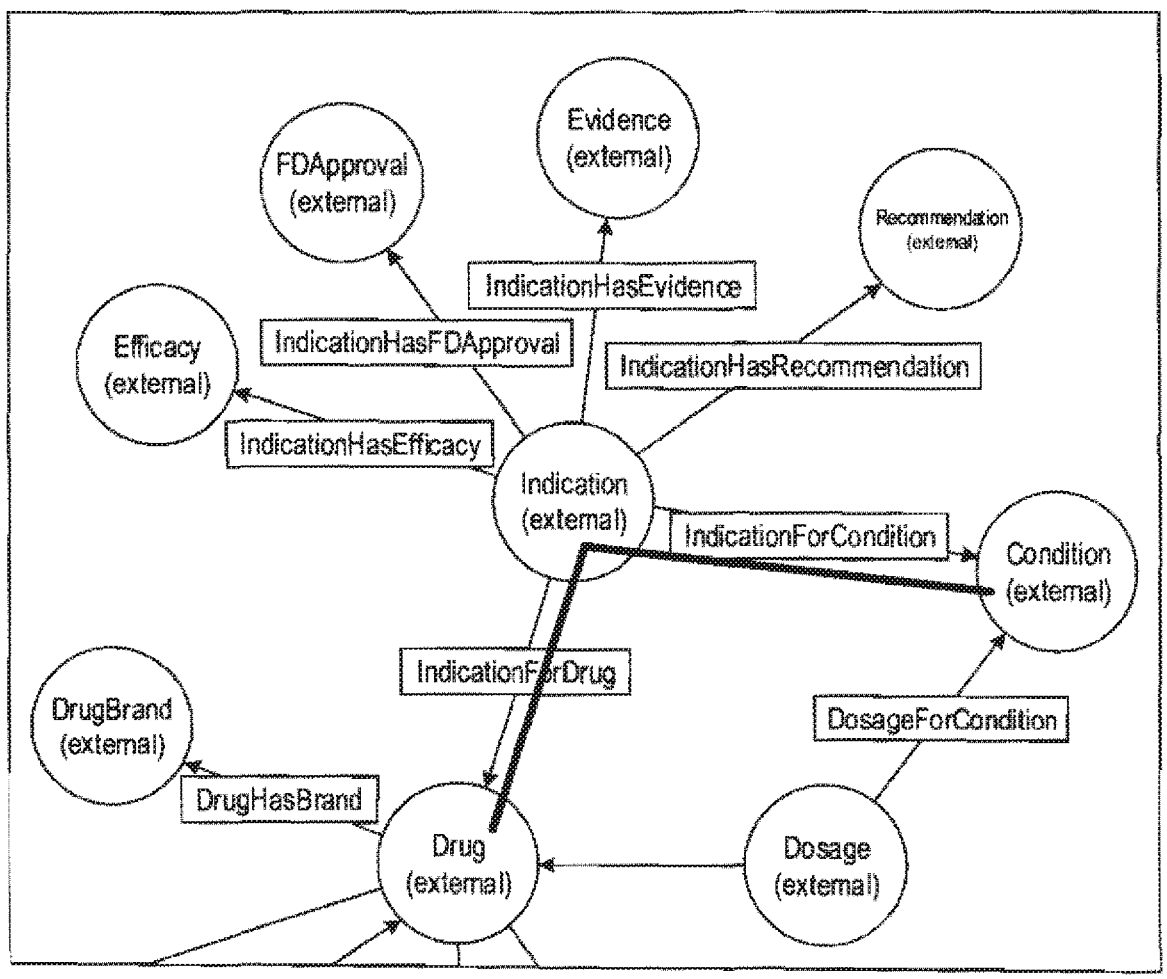

FIGS. 10A and 10B demonstrate the traversal of the ontology to identify a pairing of entities and the identifications of intent in accordance with an illustrative embodiment. As shown in FIG. 10A, a question pair for the entities "Drug" and "Finding" involves the line 1001. A SME may enter example regular expressions for questions as a starting point for generating questions based on a relationship between "Drug" and "Finding," e.g., an example question format of "What does @Drug treat?" This may be utilized with a variety of different drugs, e.g., a first intent that is associated with this pairing may be of the type "What findings does <@Drug> treat?" Such example question formats may also be gathered from domain content, e.g., performing ML and NLP on a corpus of documents to identify entities and phrases associated with these entities, or may be explicitly entered by the SME directly. For example, another type of question format may be "What drug treats headache?" Moreover, as users use the system and new questions are received that may be matched to pairings of nodes in the ontology, these same questions may be used to generate new templates from which additional questions are generated for use in expanding the understanding of the conversational system.

The artifact generation engine traverses the ontology and identifies patterns in terms of pairings of entities in the ontology and relationships corresponding to the identified query templates. As shown in FIG. 10B, these questions may be filtered according to the nodes attached to the nodes of the path between the paired nodes. For example, in FIG. 10B, for the question "What condition is treated by <@Drug>?" corresponding to the pairing of "Drug" and "Condition," indications may be filtered by the nodes attached to the indication node, e.g., efficacy, FDA approval, strength of evidence, strength of recommendation. As a result, nodes may be added to the conversational system for newly identified relationships and entities based on the identified query patterns.

Returning to FIG. 8B, with respect to entity generation, the artifact generation engine traverses domain ontology 800 and extracts all independent and dependent entities. The artifact generation engine extracts instances of extracted entities from an underlying knowledge base. Then, the artifact generation engine uploads entities 853 to the conversational space using Bulk Loading API. The artifact generation engine adds domain-specific synonyms to conversational space 850 using domain dictionaries validated by SMEs.

The artifact generation engine provides dynamic learning through a hybrid approach. The artifact generation engine defines an initial set of domain-specific intents, examples, and entities using ontology-based artifact generation. The artifact generation engine uses the Natural Language Querying (NLQ) interface to an external knowledge base for dynamic intent and entity discovery. The artifact generation engine also provides dynamic dialog creation to support discovered intents and entities.

Figure 11:
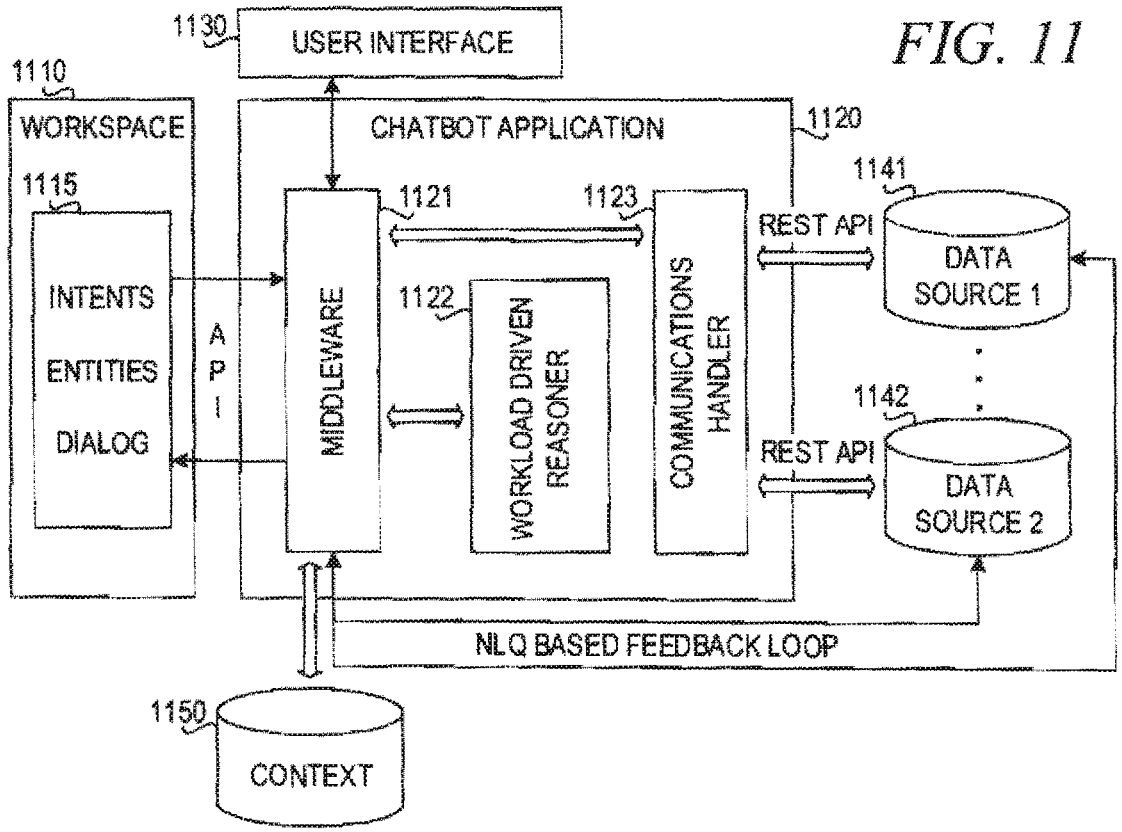
FIG. 11 is a block diagram illustrating a conversational system architecture in accordance with an illustrative embodiment.

FIG. 11 is a block diagram illustrating a conversational system architecture in accordance with an illustrative embodiment. Chatbot application 1120 interfaces with workspace 1110, which stores intents, entities, and dialog 1115 for a given interaction with a user. Chatbot application 1120 uses an application programming interface (API) to interface with workspace 1110. Chatbot application 1120 also interfaces with external data source 11141 and external data source 2 1142 via representational state transfer (REST) APIs.

Figure 12:
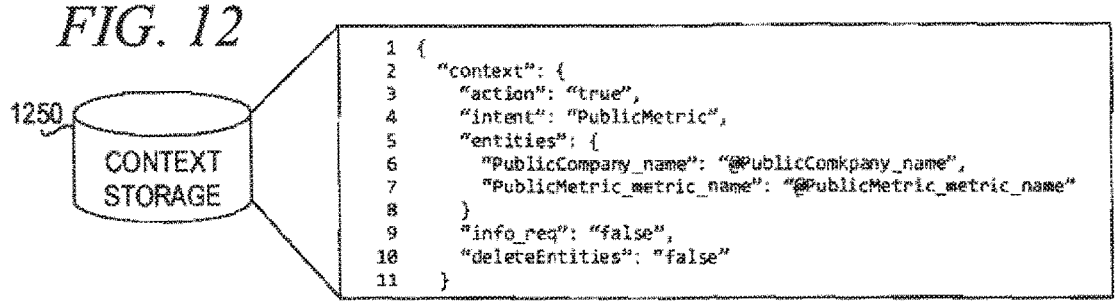
FIG. 12 is a block diagram illustrating an example of context storage in accordance with an illustrative embodiment.

The architecture of chatbot application 1120 primarily consists of middleware, 1121, workload-driven reasoner 1122, communications handler 1123, and an NLQ-based feedback loop. The middleware 1121 enables communication between the conversational service and a user interface 1130. Middleware 1121 uses context storage 1150 to keep track of the current state of user conversation. Chatbot application 1120 uses middleware 1121 to detect when the application needs to interact with external data sources 1141, 1142 and handles their responses to build appropriate data-driven context to be passed onto the conversational service. Middleware 1121 exposes functions like before- and after-hooks to enable interactions with external data sources 1141, 1142 and integrating the responses within the user conversation. FIG. 12 is a block diagram illustrating an example of context storage 1250 in accordance with an illustrative embodiment.

The reasoner 1122 chooses an appropriate external source 1141, 1142 and generates an appropriate query for the external source 1141, 1142. In the current implementation chatbot application 1120 uses a knowledge base as the external data source and a template-based reasoner design. The reasoner is boot strapped with a set of query templates that are used to generate queries to be issued against the external knowledge base. The reasoner uses the identified intents and entities to select and populate the identified templates to form an appropriate query to the knowledge base.

Communications handler 1123 controls and coordinates communication with external data sources 1141, 1142. Communications handler 1123 can be configured to use any communication protocol as required by the external data sources 1141, 1142, such as REST-based APIs or JDBC connections to databases, depending on the type of external data sources 1141, 1142 and the protocols supported. In the depicted example, communications handler 1123 uses REST-based APIs to communicate with a financial knowledge base, which exposes two APIs. One API exposes a natural language interface (NLQ interface) and the other exposes an interface for a more structured query expressed over the domain ontology.

The feedback loop provides dynamic intent and entity discovery. Chatbot application 1120 uses the NLQ interface when it does not have sufficient information to construct a more structured query against an external data source 1141, 1142. Chatbot application 1120 executes user queries using the NLQ REST interface and interprets the natural language query, the entities involved, and the structured query required to be issued against the knowledge base. The feedback loop mechanism infers the intent of the query, extracts the relevant entities and the structured query from the NLQ response. Chatbot application 1120 uses the structured query to generate a template for the corresponding inferred intent and populates the reasoner template database with the same. Chatbot application 1120 then dynamically updates the conversational service with the learned entities and intents with examples (dynamic learning). Chatbot application 1120 also dynamically constructs a dialog to enable appropriate response to the learned intent and entities should they be identified in future queries by the conversational service.

Figure 13:
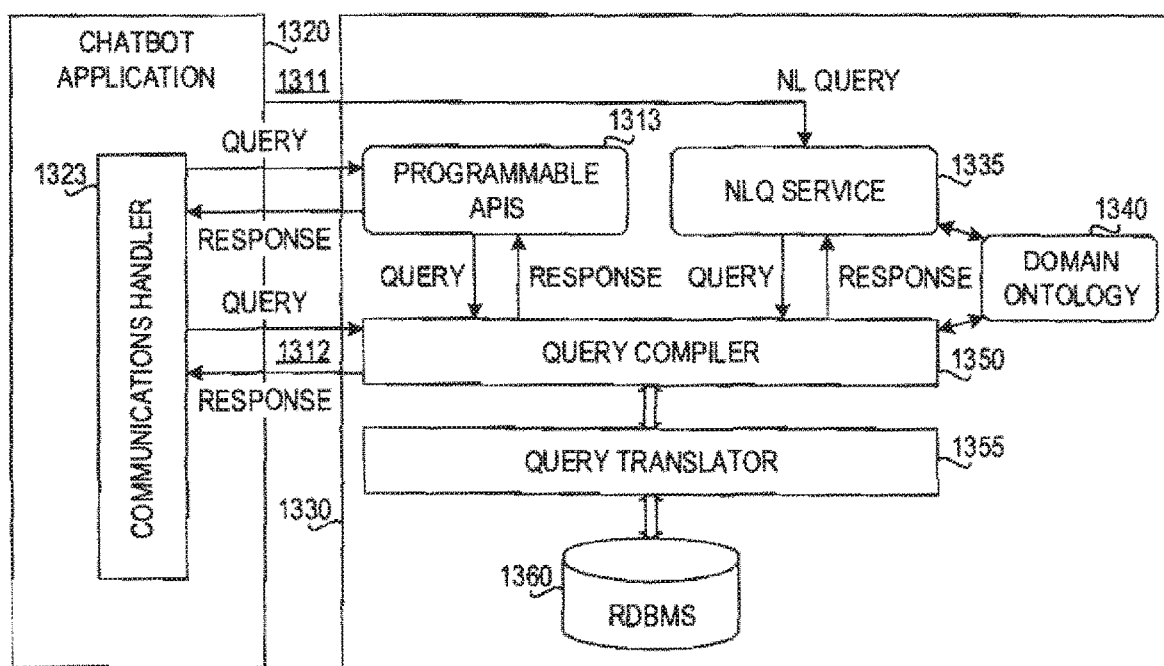
FIG. 13 is a block diagram illustrating interface between a chatbot application and an external data source in accordance with an illustrative embodiment.

FIG. 13 is a block diagram illustrating interface between a chatbot application and an external data source in accordance with an illustrative embodiment. Chatbot application 1320 includes communications handler 1323, which provides connection to external knowledge source 1330 via APIs 1311, 1312, 1313. NLQ API 1311 exposes a natural language interface (NLQ interface) that allows natural language queries to be interpreted over the domain ontology 1340. The NLQ service 1335 interprets the natural language queries over the domain ontology 1340 to produce an intermediate query representation that is fed to the query compiler 1350. The query compiler 1350 utilizes ontology to physical schema mappings and a SQL translator to convert the intermediate query representation into a SQL query to be executed against the database by NLQ service 1335.

Structured Query API 1312 exposes an interface to enable the direct expression of a more structured query (the intermediate query representation as referred above) against the domain ontology 1340. The query compiler 1350 and query translator 1355 then convert this query into a SQL query.

Programmable API 1313 allows applications to issue entity disambiguation queries. The programmable APIs 1313 convert these disambiguation calls into an intermediate query representation and provides them as input to the query compiler 1350. The query compiler 1350 and query translator 1355 then convert this disambiguation query into a SQL query.

Figure 14:
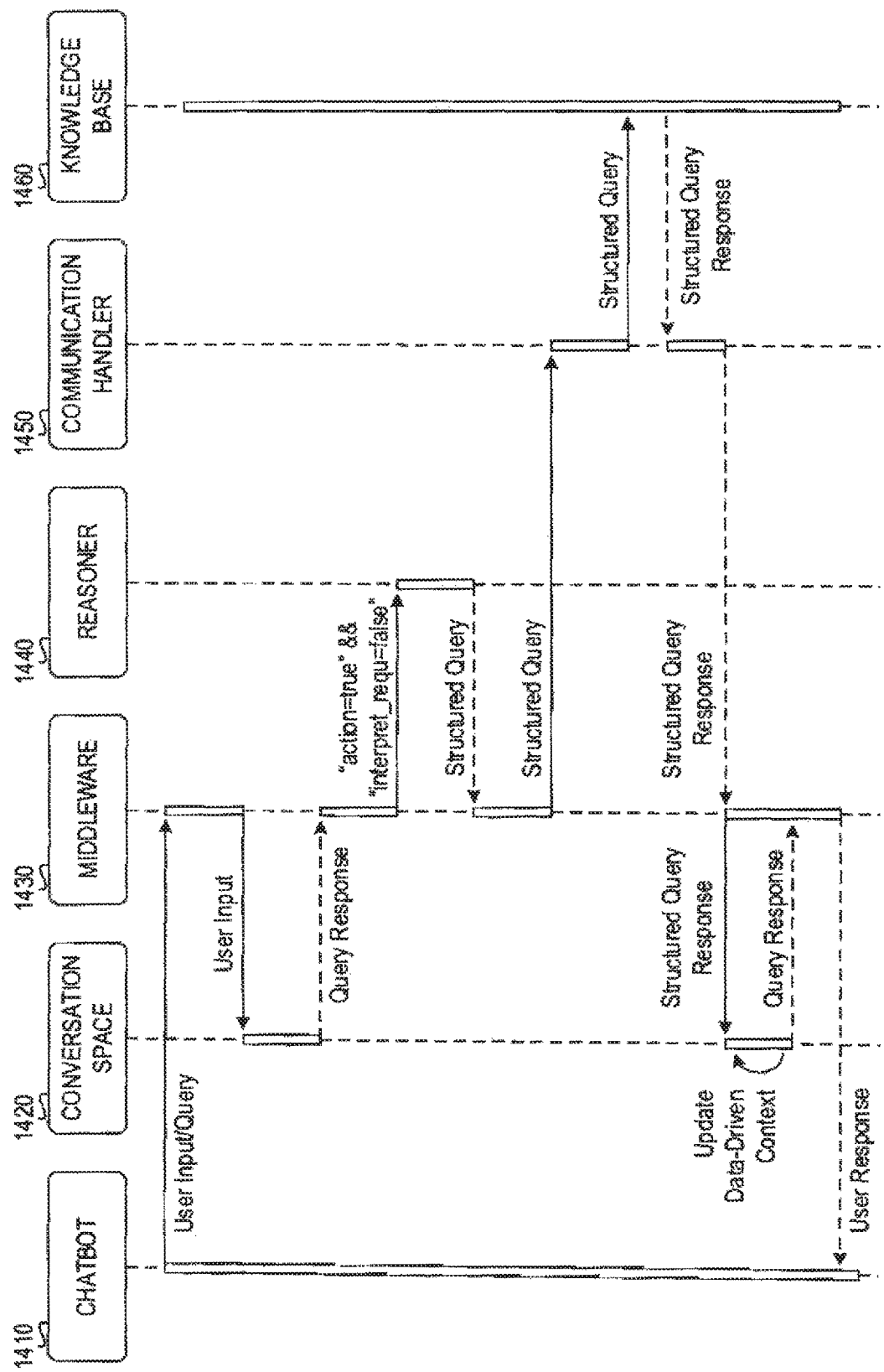
FIG. 14 is a data flow diagram illustrating data flow when the conversational system has sufficient information in terms of identified intents in accordance with an illustrative embodiment.

FIG. 14 is a data flow diagram illustrating data flow when the conversational system has sufficient information in terms of identified intents in accordance with an illustrative embodiment. Chatbot 1410 receives a user input/query and sends the user input/query to middleware 1430, which sends the user input to conversation space 1420 and receives a query response that indicates what information is needed for the user query.

Middleware 1430 determines that the action is true and that interpretation is not required. Middleware 1430 then sends this information to reasoner 1440, which submits a structured query to the middleware 1440. Middleware 1430 sends the structured query to communications handler 1450, which then sends the structured query to the knowledge base 1460. Then, knowledge base 1460 returns a structured query response to communications handler 1450, which sends the structured query response to middleware 1430.

Next, middleware 1430 sends the structured query response to conversation space 1420, which updates the data-driven context and returns a query response to middleware 1430. Finally, middleware 1430 returns the user response to chatbot 1410.

Figure 15:
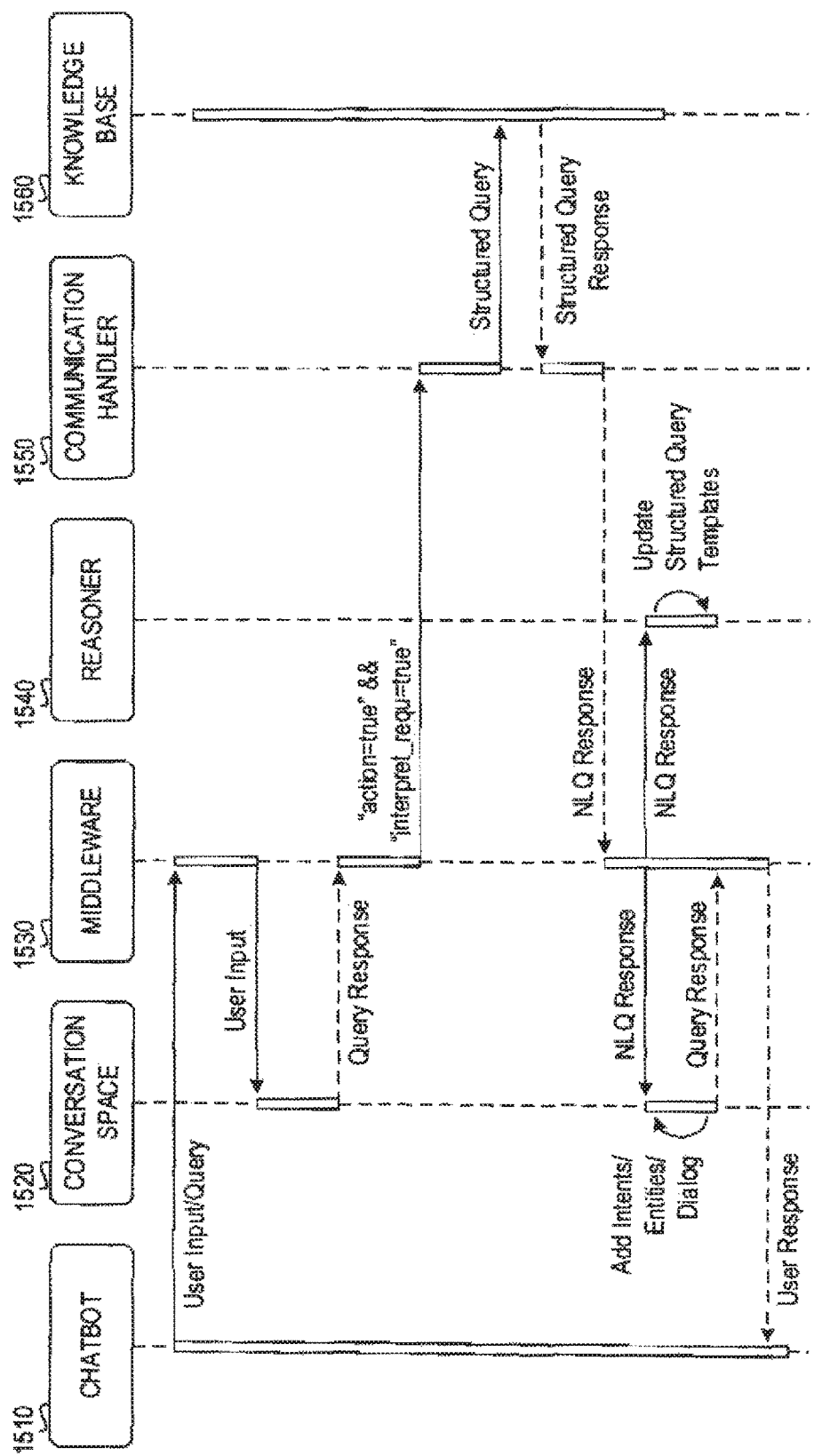
FIG. 15 is a data flow diagram illustrating data flow when the conversational system does not have sufficient information to identify the user intent in accordance with an illustrative embodiment.

FIG. 15 is a data flow diagram illustrating data flow when the conversational system does not have sufficient information to identify the user intent in accordance with an illustrative embodiment. Chatbot 1510 receives a user input/query and sends the user input/query to middleware 1530, which sends the user input to conversation space 1520 and receives a query response that indicates what information is needed for the user query.

Middleware 1530 determines that the action is true and that interpretation is required. Middleware 1530 then sends this information to communications handler 1550, which then sends an NLQ query to the knowledge base 1560. Then, knowledge base 1560 returns an NLQ response to communications handler 1550, which sends the NLQ response to middleware 1530.

Next, middleware 1530 sends the NLQ response to reasoner 1540 and conversation space 1520. Reasoner 1540 updates the structured query templates based on the NLQ response. Conversation space 1520 adds intents, entities, and dialog to the workspace. Finally, middleware 1530 returns the user response to chatbot 1510.

Figure 16:
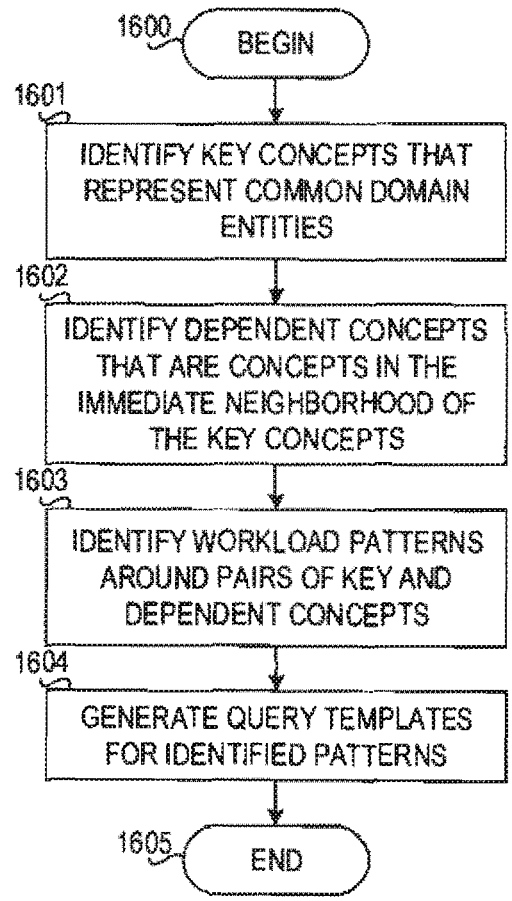
FIG. 16 is a flowchart illustrating operation of an artifact generation engine for intent generation in accordance with an illustrative embodiment.

FIG. 16 is a flowchart illustrating operation of an artifact generation engine for intent generation in accordance with an illustrative embodiment. Operation begins (block 1600), and the artifact generation engine identifies key concepts that represent common domain entities (block 1601) and identifies dependent concepts that are concepts in the immediate neighborhood of the key concepts (block 1602). Then, the artifact generation engine identifies workload patterns around pairs of key and dependent concepts (block 1603). Then, the artifact generation engine generates query templates for the identified patterns (block 1604). Thereafter, operation ends (block 1605).

Figure 17:
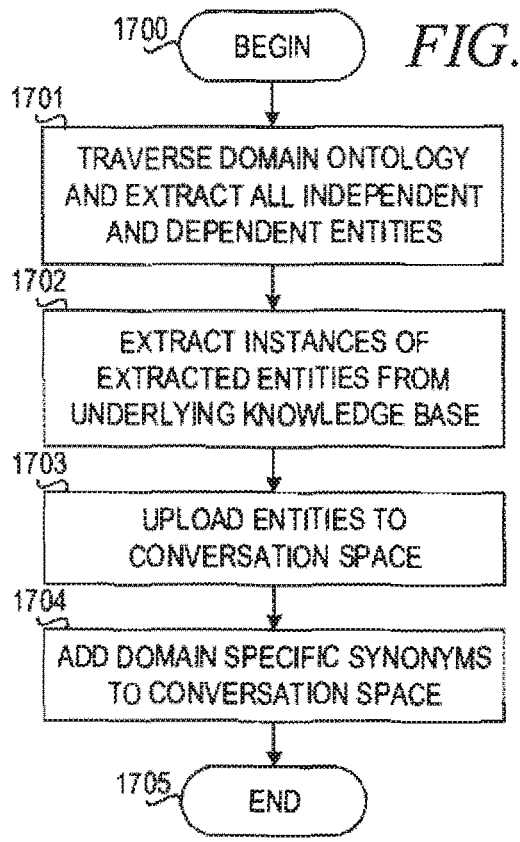
FIG. 17 is a flowchart illustrating operation of an artifact generation engine for generating entities in accordance with an illustrative embodiment.

FIG. 17 is a flowchart illustrating operation of an artifact generation engine for generating entities in accordance with an illustrative embodiment. Operation begins (block 1700), and the artifact generation engine traverses the domain ontology and extracts all independent and dependent entities (block 1701). The artifact generation engine extracts instances of extracted entities from an underlying knowledge base (block 1702). Then, the artifact generation engine uploads the entities to the conversation space (block 1703) and adds domain-specific synonyms to the conversation space (block 1704). Thereafter, operation ends (block 1705).

Figure 18:
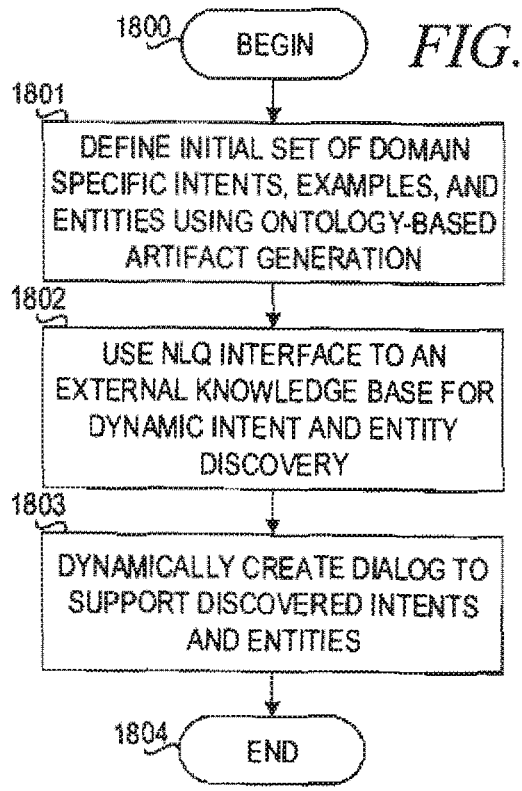
FIG. 18 is a flowchart illustrating operation of an artifact generation engine for dynamic learning using a hybrid approach in accordance with an illustrative embodiment.

FIG. 18 is a flowchart illustrating operation of an artifact generation engine for dynamic learning using a hybrid approach in accordance with an illustrative embodiment. Operation begins (block 1800), and the artifact generation engine defines an initial set of domain-specific intents, examples, and entities using ontology-based artifact generation (block 1801). The artifact generation engine uses NLQ interface to an external knowledge base for dynamic intent and entity discovery (block 1802). The artifact generation engine dynamically creates a dialog to support discovered intents and entities (block 1803). Thereafter, operation ends (block 1804).

Figure 19:
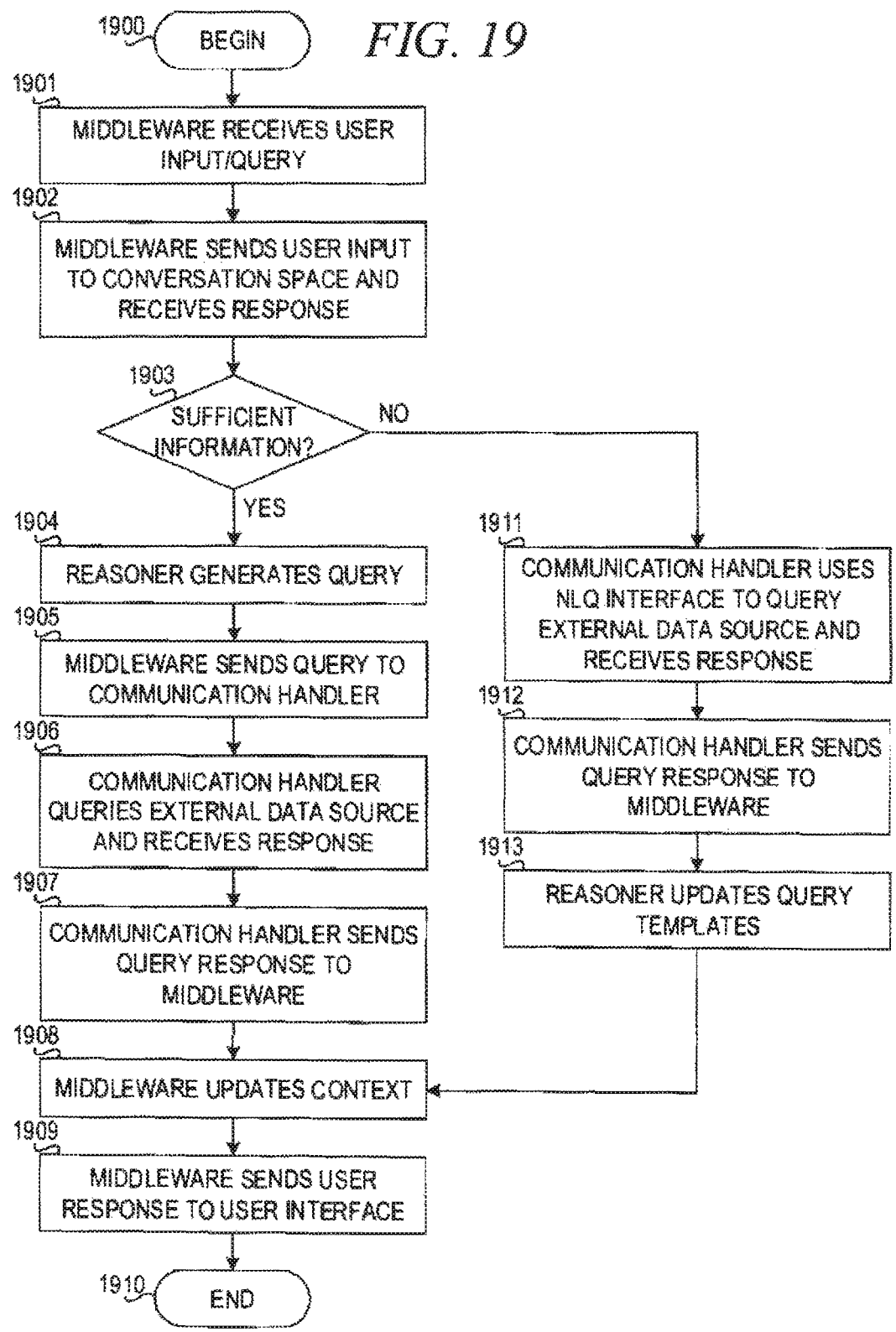
FIG. 19 is a flowchart illustrating operation of a conversational system with dynamic learning in accordance with an illustrative embodiment.

FIG. 19 is a flowchart illustrating operation of a conversational system with dynamic learning in accordance with an illustrative embodiment. Operation begins (1900), and a middleware component of the conversational system receives a user input/query (block 1901). The middleware component sends the user input to a conversational space and receives a response (block 1902). The middleware component determines whether there is sufficient information in the user input and the conversational space to determine user intent (block 1903).

If there is sufficient information, a reasoner component within the conversational system generates a structured query (block 1904), and the middleware component sends the structured query to a communications handler component of the conversational system (block 1905). The communications handler component queries an external data source and receives a query response (block 1906). The communications handler component sends the query response to the middleware (block 1907), which updates the context (block 1908). Then, the middleware component sends the user response to the user interface (block 1909), and operation ends (block 1910).

If there is no sufficient information to identify user intent in block 1903, then the communications handler component uses a natural language query (NLQ) interface to query the external data source and receives a natural language response (block 1911). The communications handler component sends the natural language response to the middleware component (block 1912). The reasoner updates structured query templates based on the natural language response (block 1913). Thereafter, the middleware component updates the context (block 1908), the middleware component sends the user response to the user interface (block 1909), and operation ends (block 1910).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a conversational system artifact generation, the method comprising:
   receiving, by a middleware component of the conversational system, a user input;
   determining, by the middleware component, whether there is sufficient information in the user input and a conversation space in a context storage of the conversational system to identify user intent associated with the user input, wherein the conversation space includes intents, entities, dialog, and context for a given interaction with the user;
   responsive to the middleware component determining there is not sufficient information to identify user intent, sending, by a communications handler component within the conversational system, a natural language query to an external data source via a natural language query (NLQ) interface;
   receiving, by the communications handler component, a natural language response from the external data source;
   updating, by the middleware component, the conversation space based on the natural language response; and
   returning, by the middleware component, a user response based on the natural language response.

2. The method of claim 1, further comprising updating, by a reasoner component within the conversational system, structured query templates based on the natural language response.

3. The method of claim 2, further comprising:
   responsive to the middleware component determining there is sufficient information to identify user intent, generating, by a reasoner component within the conversational system, a structured query based on the structured query templates;
   sending, by the middleware component, the structured query to the communications handler component; and
   sending, by the communications handler component, the structured query to the external data source; and receiving, by the communications handler component, a structured query response from the external data source.

4. The method of claim 1, further comprising:
   generating query templates to be associated with intents for the conversational system based on an ontology, a domain corpus of documents, and prior user questions; and
   storing the query templates in a structured query template storage.

5. The method of claim 4, wherein generating the query templates comprises:
   identifying key concepts in a domain ontology that represent common domain entities;
   identifying dependent concepts in the domain ontology that are concepts in an immediate neighborhood of the key concepts;
   identifying workload patterns around pairs of key concepts and dependent concepts; and
   generating the query templates for the identified workload patterns.

6. The method of claim 4, wherein generating the query templates comprises generating the query templates using regular expressions.

7. The method of claim 4, wherein generating the query templates comprises:
   using natural language processing and machine learning techniques to identify entities and usage patterns over the domain corpus of documents and the prior user questions;
   generating the query templates for the identified entities and usage patterns.

8. The method of claim 1, wherein updating the conversation space comprises:
   extracting a new intent and one or more new entities from the natural language response;
   dynamically generating a new dialog that responds to the new intent; and
   adding the new intent, the one or more new entities, and the new dialog to the conversation space.

9. A computer program product comprising a computer readable storage medium having a computer readable program stored therein, wherein the computer readable program, when executed on a processor of a data processing system, causes the data processing system to implement a conversational system with artifact generation, wherein the computer readable program causes the data processing system to:
   receive, by a middleware component of the conversational system, a user input;
   determine, by the middleware component, whether there is sufficient information in the user input and a conversation space in a context storage of the conversational system to identify user intent associated with the user input, wherein the conversation space includes intents, entities, dialog, and context for a given interaction with the user;
   responsive to the middleware component determining there is not sufficient information to identify user intent, send, by a communications handler component within the conversational system, a natural language query to an external data source via a natural language query (NLQ) interface;
   receive, by the communications handler component, a natural language response from the external data source;

update, by the middleware component, the conversation space based on the natural language response; and return, by the middleware component, a user response based on the natural language response.

10. The computer program product of claim 9, wherein the computer readable program further causes the data processing system to update, by a reasoner component within the conversational system, structured query templates based on the natural language response.

11. The computer program product of claim 10, wherein the computer readable program further causes the data processing system to:

responsive to the middleware component determining there is sufficient information to identify user intent, generate, by a reasoner component within the conversational system, a structured query based on the structured query templates;

send, by the middleware component, the structured query to the communications handler component; and send, by the communications handler component, the structured query to the external data source; and receive, by the communications handler component, a structured query response from the external data source.

12. The computer program product of claim 9, wherein the computer readable program further causes the data processing system to:

generate query templates to be associated with intents for the conversational system based on an ontology, a domain corpus of documents, and prior user questions; and store the query templates in a structured query template storage.

13. The computer program product of claim 12, wherein generating the query templates comprises:

identifying key concepts in a domain ontology that represent common domain entities;

identifying dependent concepts in the domain ontology that are concepts in an immediate neighborhood of the key concepts;

identifying workload patterns around pairs of key concepts and dependent concepts; and generating the query templates for the identified workload patterns.

14. The computer program product of claim 12, wherein generating the query templates comprises generating the query templates using regular expressions.

15. The computer program product of claim 12, wherein generating the query templates comprises:

using natural language processing and machine learning techniques to identify entities and usage patterns over the domain corpus of documents and the prior user questions;

generating the query templates for the identified entities and usage patterns.

16. The computer program product of claim 9, wherein updating the conversation space comprises:

extracting a new intent and one or more new entities from the natural language response;

dynamically generating a new dialog that responds to the new intent; and adding the new intent, the one or more new entities, and the new dialog to the conversation space.

17. An apparatus comprising:
a processor; and
a memory coupled to the processor, wherein the memory comprises instructions which, when executed by the processor, cause the processor to implement a conversational system with artifact generation, wherein the instructions cause the processor to:

receive, by a middleware component of the conversational system, a user input;

determine, by the middleware component, whether there is sufficient information in the user input and a conversation space in a context storage of the conversational system to identify user intent associated with the user input, wherein the conversation space includes intents, entities, dialog, and context for a given interaction with the user;

responsive to the middleware component determining there is not sufficient information to identify user intent, send, by a communications handler component within the conversational system, a natural language query to an external data source via a natural language query (NLQ) interface;

receive, by the communications handler component, a natural language response from the external data source;

update, by the middleware component, the conversation space based on the natural language response; and return, by the middleware component, a user response based on the natural language response.

18. The apparatus of claim 17, wherein the instructions further cause the processor to:

update, by a reasoner component within the conversational system, structured query templates based on the natural language response;

responsive to the middleware component determining there is sufficient information to identify user intent, generate, by a reasoner component within the conversational system, a structured query based on the structured query templates;

send, by the middleware component, the structured query to the communications handler component; and send, by the communications handler component, the structured query to the external data source; and receive, by the communications handler component, a structured query response from the external data source.

19. The apparatus of claim 17, wherein the instructions further cause the processor to:

generate query templates to be associated with intents for the conversational system based on an ontology, a domain corpus of documents, and prior user questions; and store the query templates in a structured query template storage.

20. The apparatus of claim 17, wherein updating the conversation space comprises:

extracting a new intent and one or more new entities from the natural language response;

dynamically generating a new dialog that responds to the new intent; and adding the new intent, the one or more new entities, and the new dialog to the conversation space.

* * * * *